Jan. 16, 1968  W. C. KAERCHER, JR  3,363,424

MACHINE FOR BURYING FLEXIBLE PIPES AND THE LIKE

Filed Aug. 19, 1965

INVENTOR.
WILLIAM C. KAERCHER, JR.
BY
Meyers & Peterson
ATTORNEYS

United States Patent Office 3,363,424
Patented Jan. 16, 1968

3,363,424
MACHINE FOR BURYING FLEXIBLE PIPES
AND THE LIKE
William C. Kaercher, Jr., Minneapolis, Minn., assignor to
Gamma, Inc., Minneapolis, Minn., a corporation of
Minnesota
Filed Aug. 19, 1965, Ser. No. 481,039
11 Claims. (Cl. 61—72.7)

ABSTRACT OF THE DISCLOSURE

A self-propelled machine has a pair of arms pivotally mounted at their upper ends and eccentric means for oscillating the arms forwardly and rearwardly as the machine traverses the ground. A cross member extends between the lower ends of the arms and supports a thin blade devoid of any projections, the blade being oscillated forwardly and rearwardly by the arms. A flexible cable or chain is attached at one end to the lower end of the blade and a tunnel-forming member is attached to the other end of the cable or chain. To the tunnel-forming member is attached the connecting means via which a cable or pipe to be buried can be implanted.

This invention relates generally to a machine for implanting flexible pipe or cable beneath the ground, and pertains more particularly to a machine having a downwardly projecting vertical blade or knife that is repeatedly oscillated or swung forwardly and rearwardly to provide impact forces to a trailing tunnel-forming member.

By delivering intermittent impact forces to a tunnel-forming member beneath the ground surface, a flexible conduit can be efficiently buried in the ground with a comparatively small amount of power. Furthermore, the utilization of intermittent impact forces enhances the traction of the self-propelled machine and therefore the machine can be of relatively small size. It has been found that the use of an oscillatory drive mechanism is a simple form of drive for the vertically and downwardly directed blade. However, this results in the lower end of the blade traversing an arcuate path and when the tunnel-forming member is mounted integral with the blade, certain difficulties arise, although such an arrangement has proved to be generally quite satisfactory in actual practice. It is a general object of this invention to eliminate or minimize the difficulties that have been experienced where the tunnel-forming member is carried directly on the downwardly extending blade and moves in unison therewith.

It will be appreciated that where the tunnel-forming member is monuted directly on the oscillatory blade, there is an upward and downward component of motion imparted thereto as the blade traverses its arcuate path. This causes the hole being formed to be chopped up to some extent and the jarring or agitating action knocks some of the dirt back into the hole which interferes with the advancement of the conduit being laid. More specifically, the invention has for an aim the provision of a "clean" hole through which the conduit can be readily pulled with little obstruction and friction that would otherwise exist.

Another object of the invention is to provide a considerable amount of versatility as far as the operation of the machine is concerned. In this regard, it is an aim of the invention to allow the operator to select different amounts of stroke for the oscillatory blade. Thus, if it proves advantageous to have the blade swing through a relatively large arc, this can be done without causing the tunnel-forming member and the conduit being pulled thereby to follow such a swing. Also, it allows the operator to have the blade move forwardly and rearwardly from a central position. In other words, the blade can start from a position directly beneath the pivot point and move forwardly from such a postion and then return to this position, or it can be adjusted to move rearwardly from the position directly beneath the pivot point and then return to such position. Consequently, machines can be manufactured with an adjustable stroke or swing of the blade and thus allow the operator to operate the machine for the particular soil conditions that are being encountered at the moment. Also, this feature allows the amount of impact force per stroke to be selected without varying the power of the engine. Still further, where the manufacturer makes machines with a fixed stroke or swing, any desired stroke or swing can be adopted that best suits the designer.

Another object is to provide a machine of the foregoing character that allows the tunnel-forming member to be almost any length, the limitation on length being influenced largely by the curves or returns to be negotiated by the machine in following a desired pattern. It will be appreciated that the lack of any serious restrictions on length, permits various shock absorption mechanisms to be incorporated into the confines of the tunnel-forming member and also grants greater latitude with respect to the selection of the connecting or coupling means to be utilized in attaching the conduit to said member.

Another object of the invention is to avoid any likelihood of a force being applied rearwardly against the conduit being implanted. Therefore, the invention has for an aim the provision of a flexible elongated member between the downwardly extending blade and the tunnel-forming member so that it is impossible for the blade to apply a rearwardly directed force against the tunnel-forming member which would in turn be transmitted against the conduit. Hence, only impact forces in a forward direction will be transmitted to the conduit. Stated somewhat differently, the conduit can be attached directly to the tunnel-forming member when practicing the teachings of the present invention, for the tunnel-forming member never moves rearwardly.

Yet another object of the invention is to allow the conduit being laid to be pulled through a curvilinear path if circumstances so dictate. Thus, while it is important to pull the cable at a predetermined depth and in a horizontal plane, there will be situations where turns must be made and the instant invention provides an arrangement whereby such turns can be realized more readily than when the tunnel-forming member is mounted directly on the oscillatory blade.

Briefly described, the machine according to the invention comprises a self-propelled mechanism which traverses the ground and creates a tunnel at a predetermined distance beneath the ground surface into which the pipe or cable, hereinafter referred to as "conduit," is continuously introduced and advanced as the tunnel becomes longer and longer. To form the tunnel, the machine is equipped with an oscillatory arm means which is pivoted on a transverse axis dipsosed at a preferred elevation with respect to the wheeled support frame. The oscillatory arm means has depending therefrom a knife or blade for cutting the turf, the knife or blade being arranged in a vertical plane, and providing a towing point beneath the surface of the ground. The tunnel-forming member itself consists of a cylindrical body with a rounded forward end and the member is attached to a flexible cable or chain to the lower end of the blade. Owing to the flexible connection of the tunnel-forming member, the construction differs appreciably from the prior art where the tunnel-forming member has been rigidly affixed to the lower end of the oscillatory knife or blade. In this way, the present structure insures that the tunnel-forming member will move through the ground in a horizontal direction. For the most part, such direction will be linear although a curvilinear path can be followed when the conduit laying pattern so requires. Severe agitation of the soil is thereby avoided and a cleaner tunnel results than heretofore. Since the invention contemplates the use of a flexible cable or chain between the oscillating blade and the tunnel-forming member, the conduit itself can be connected directly to the tunnel-forming member in a trailing relation without the chance of the tunnel-forming member being forced rearwardly against the forward end of the conduit being buried.

These and other objects and advantages of the invention will more fully appear from the following description, made in connection with the accompanying drawings, wherein like reference characters refer to the same or similar parts throughout the several views and in which.

Figure 1:
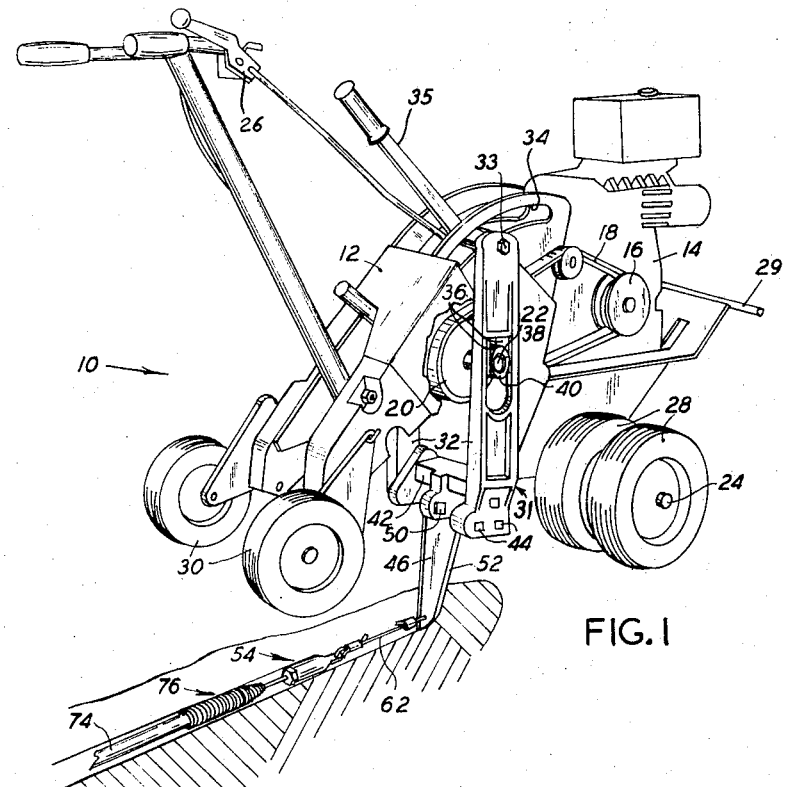
FIGURE 1 is a pictorial representation of a machine according to the invention with certain parts broken away in order to show to better advantage the manner in which the blade is oscillated and the ground being depicted in section for the purpose of revealing how the tunnel or hole is actually formed.

Referring now to FIGURE 1, the machine according to the invention is generally indicated at 10 and comprises a frame or chassis 12 carrying a power means, such as a gasoline motor 14. A drive pulley 16 on the motor 14 is connected via a belt 18 to a driven pulley 20, which is rotatably journaled in the frame or chassis 12, as by a shaft 22. In its preferred embodiment, the machine 10 is self-propelled and for this purpose a gear train (not shown) is connected between the shaft 22 and a shaft 24 on which a plurality of drive wheels 28 is mounted, two of which appear in FIGURE 1. More specifically, it can be explained that a worm is mounted on the shaft 22 and is in mesh with a worm gear that slants downwardly and forwardly, carrying a bevel gear at its lower end which is in mesh with a larger bevel gear on the shaft 24. By suitably selecting appropriate gear ratios, the wheels 28 can be rotated at a suitably low speed. It will be understood that a suitable clutch or belt-tensioning element may be employed to disengage the drive to the forward wheels, if desired, for instance, actuated by the lever 26. A transverse bumper bar 29 is fixedly mounted at the front of the frame 12 and it will be appreciated that the machine can be tilted forwardly so that the mahcine then rests on the bumper bar 29 and the wheels 28. In the normal operation of the machine, though, the frame 12 is supported on the wheels 28 and additional wheels 30 at the rear thereof.

The machine 10 further comprises an oscillating U-frame or carrier, generally indicated at 31, which additional frame or carrier includes a pair of arms 32 pivotally mounted on an adjustable transverse axis provided by the shaft or pivot pin 33. It will be discerned that the shaft or pivot pin 33 is movable in arcuate slots 34 located in the main frame or chassis 12, the shifting thereof being through the agency of a handle 35. The arms 32 are longitudinally slotted as shown to provide a pair of spaced parallel cam strips labeled 36. An eccentric bearing mechanism is carried on the shaft 22 so as to be rotated therewith, the eccentric bearing mechanism being composed of an eccentric disc 38 and a needle bearing assembly 40 disposed therearound. While the details of the bearing assembly 40 are not shown, it will be understood that the outer race thereof fits closely within the space between the cam strips 36 and that rotation of the eccentric disc 38 will therefore impart an oscillatory motion to the arms 32 to cause them to swing or pivot about the shaft 33. The U-shaped frame or carrier 31 further includes a cross member 42 which is fixedly attached to the lower ends of the arms 32 in any suitable manner, as by means of bolts 44, for example. Consequently, it will be understood that the arms 32 and the cross member 42 swing or oscillate as a unit to cause the cross member 42 to traverse an arcuate path forwardly and rearwardly.

Depending in a fixed relation from the cross member 42 at its midpoint is a knife or blade 46, which is secured to the cross member 42 in the present instance by bolts 50. The forward edge of the blade 46 is sharpened as indicated at 52 to facilitate the passage of the blade through the ground. The bolts 50, quite obviously, allow the blade to be removed for sharpening purposes or to allow its complete replacement if it becomes damaged.

Figure 4:
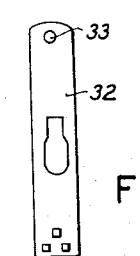
FIGURE 4 is a diagrammatic view illustrating the arcuate path traversed by the lower end of the oscillatory blade for the purpose of demonstrating with greater clarity the problems that have been herein overcome.

As can be seen from FIGURE 4, the blade 46 is constrained to follow the arcuate path previously mentioned and this path has been denoted by the reference numeral 53. It might be explained that the scale of FIGURE 4 corresponds generally to that of FIGURE 1 and it will be readily discerned that the blade 46 swings upwardly as it moves forwardly and also swings upwardly as it moves rearwardly, thereby introducing a vertical component of motion that is efficiently removed when following the teachings of the present invention and which will become clearer in the ensuing portion of the description.

Figure 2:
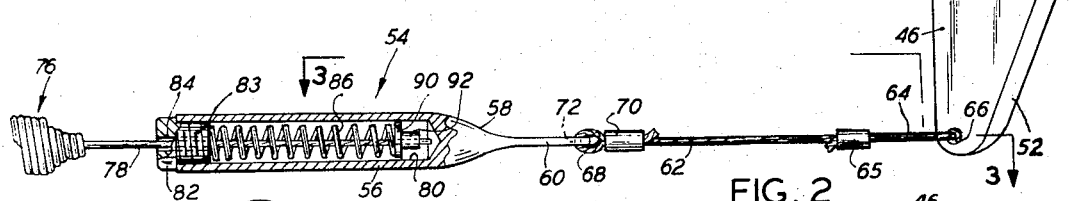
FIGURE 2 is a detailed elevational view, partly in section, showing the lower end of the knife, the flexible cable connected thereto, the trailing tunnel-forming member and a portion of the resilient coupling to which the conduit (not shown in this figure) is connected.

For the purpose of making a bore or tunnel beneath the surface of the ground into which the conduit is to be laid, a tunnel-forming member or tool 54 is provided. As shown in detail in FIGURE 2, the tunnel-forming member 54 includes a generally cylindrical casing 56 having a rounded forward end 58 of hardened steel and a lug 60 projecting integrally therefrom. A flexible cable 62 provides the means by which the tunnel-forming member 54 is connected to the blade 46. It should be emphasized at this point that the utilization of a flexible coupling means between the blade 46 and the tunnel-forming member 54 is exceedingly important to the practicing of the present invention. The cable 62 is reversely bent upon itself to form a loop 64, there being a tubular clamp 65 that is crimped onto the cable in order to maintain the loop. The loop 64 passes through an aperture 66 formed in the lower or free end of the blade 46 to effect the connection of the cable 62 to the blade 46. If desired, an oval link may be interposed between the blade 46 and the loop 64 or the cable 62 can constitute a chain, if circumstances make such a flexible coupling means preferable. The rear or trailing end of the cable 62 is similarly connected to the lug 60, there being a loop 68 and a tubular clamp 70 which effect the connection through the medium of an aperture 72 provided in the lug 60.

Figure 5:
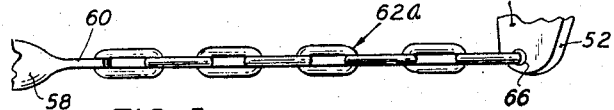
FIGURE 5 is a partial elevational view showing a chain coupling the knife and the tunnel-forming member.

FIGURE 5 shows a chain, designated 62a, as an alternative flexible coupling means between knife 46 and tunnel-forming member 54. It should be noted that the dimensions of the links of chain 62a are substantially the same as the end loops 64 and 68 of cable 62.

The conduit, in the form of a flexible pipe, tube or electrical cable, to be implanted is generally indicated at 74 in the drawing. The conduit 74 is connected to the tunnel-forming member 54 through the agency of a coupler 76 and a short length of cable 78. The tunnel-forming member 54 can be of a length so as to readily incorporate thereinto a shock absorbing mechanism. Accordingly, the tunnel-forming member 54 is provided with a cylindrical bore 80 which receives at its rear end a plug 82 having threads 83 thereon which retain the plug in a fixed relationship with the tunnel-forming member 54. The plug 82 has a passage 84 extending therethrough for the accommodation of the forward portion of the cable 78. Concentrically disposed within the bore 80 and in an encircling relationship with the cable 78 is a coil compression spring 86. The spring 86 has one end bearing against the plug 82 and its other end bearing against a washer 90 which is held captive by reason of a tubular clamp 92 that is crimped onto the free end of the cable 78. It will be appreciated that all of the conduit pulling force is transmitted rearwardly from the tunnel-forming member 54 through the coil spring 86. Hence, the coil spring 86, assuming that it has the proper spring constant, will absorb any excessive impact loads that might be experienced.

In operation, the machine 10 is taken to the starting point where the conduit 74 is to be laid. The machine 10 can be easily tilted forwardly so that the weight thereof rests on the wheels 28 and the bumper bar 29. Having connected the conduit 74 to the coupler or connecting unit 76, the motor 14 can be started and with the U-shaped frame unit or carrier 31 oscillating, the also oscillating blade 46 can be introduced into the ground by slowly pivoting the entire machine about its forward wheels 28 until the wheels 30 rest on the ground. The forward motion of the machine 10 is then initiated, as by manipulation of the lever 26, and the oscillating blade 46 cuts a slot in the turf due to its knife edge 52 and the fact that it is constantly moving forwardly and rearwardly.

Figure 3:
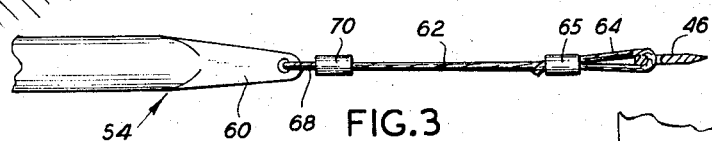
FIGURE 3 is a top plan view corresponding to FIGURE 2 but with the lower portion of the blade shown in section, the view being taken generally in the direction of line 3—3 of FIGURE 2.

Inspection of FIGURE 3 will show that the blade 46 is quite slender with respect to the width or diameter of the tunnel-forming member 54. Hence, the blade 46 meets with very little resistance as it moves forwardly because of its relatively narrow width compared to that of the tunnel-forming member. Also, the width of the cable 62 is virtually insignificant and therefore even though the lower end of the blade 46 traverses an arcuate path which curves upwardly at the forward end of the stroke and upwardly at the rearward end of the stroke, this upward component of motion is not transmitted in any sense of the word to the tunnel-forming member 54. Consequently, there is a very efficient conversion of oscillatory or arcuate movement to rectilinear motion when the machine 10 is moving in a straight line. Of course, when the machine 10 deviates from a straight line, the tunnel-forming member 54 will follow the same path. The point to be appreciated at the moment, though, is that the vertical component introduced by the blade 46 is not transmitted to the trailing tunnel-forming member 54 and the conduit 74 being pulled thereby. The advantages derived from such an operation have already been hereinbefore explained.

Therefore, as the machine 10 advances over the ground, the tunnel-forming member 54 will be drawn through the hole or tunnel made by the member 54 and this tunnel will be for all intents and purposes the same size as the tunnel-forming member 54. In other words, there will not be the jarring or agitation that would be present if the tunnel-forming member were carried directly at the lower end of the blade 46. Thus, the arcuate path 53 is changed to a linear one as far as the tunnel-forming member 54 and the conduit 74 are concerned.

It will, of course, be understood that various changes may be made in the form, details, arrangements and proportions of the parts without departing from the scope of the invention as set forth in the appended claims.

I claim:

1. In a machine for burying an elongated conduit beneath the surface of the ground, the machine having a downwardly projecting blade element having a width of uniform thinness throughout its length so as to be free of any lateral projection beneath the surface of the ground and having a forward edge extending only downwardly in a substantially straight line to its lower free end so as to be devoid of any forward projection beneath the surface of the ground, means on the machine for oscillating said blade element only forwardly and rearwardly in an arcuate path having horizontal and vertical components, an elongated means connected to and extending rearwardly, and yieldable rearwardly from the lower end of said blade element, a tunnel-forming member having a width greater than that of said blade element connected to the trailing end of said elongated means, and means on said tunnel-forming member for connection to one end of the conduit to be buried.

2. A machine as recited in claim 1 wherein said elongated means comprises a cable.

3. A machine as recited in claim 1 wherein said elongated means comprises a chain.

4. A machine for burying an elongated conduit beneath the surface of the ground comprising a wheeled support frame movable along the surface of the ground, arm means having upper and lower ends, means mounting the upper end of said arm means for pivotal movement about a transverse axis at a preferred elevation on said frame, whereby the lower end of said arm means is constrained to swing forwardly and rearwardly in an arcuate path, power means for oscillating said arm means to cause the lower end of said arm means to traverse said arcuate path, a vertical blade element having a width of uniform thinness throughout its length so as to be free of any lateral projection beneath the surface of the ground and having a forward edge extending only downwardly in a substantially straight line to its lower free end so as to be devoid of any forward projection beneath the surface of the ground, said blade element being fixedly attached at its upper end to the lower end of said arm means and extending downwardly so as to also traverse only a forwardly and rearwardly arcuate path having horizontal and vertical components when said arm means is oscillated, elongated means having its forward end connected to said blade element and its rear end thus in a trailing relation, said elongated means being yieldable in the direction of its rear end, a tunnel-forming member having a width greater than that of said blade element and means connected to the rear end of said elongated means so as to traverse a substantial linear path when pulled forwardly beneath the ground surface, and means on said tunnel-forming member for connection to one end of the conduit to be buried.

5. A machine as recited in claim 4 in which the width of the blade element is appreciably narrower than the width of said tunnel-forming member.

6. A machine for burying an elongated conduit beneath the surface of the ground comprising a wheeled support frame movable along the surface of the ground, a carrier pivotally mounted on said support frame for oscillatory motion about a horizontal axis, means for oscillating said carrier only forwardly and rearwardly, a blade having a width of uniform thinness throughout its length so as to be free of any lateral projection beneath the surface of the ground and having a forward edge extending only downwardly in a substantially straight line to its lower free end so as to be devoid of any forward projection beneath the surface of the ground, said blade being connected to said carrier and adapted to be forced through the ground by the combined forward motion of said support frame and the oscillatory motion of said carrier, said oscillatory motion in only a forward and rearward arcuate path imparting a vertical movement to said blade in addition to its forward movement, an elongated coupling means secured at one of its ends to said blade at the free lower end thereof and yieldable rearwardly, a tunnel-forming member having a width greater than that of said blade attached to said elongated coupling means at its other end, and means for attaching the conduit to be implanted to said tunnel-forming member.

7. A machine as recited in claim 6 wherein said tunnel-forming member comprises a cylindrical body having a rounded forward end thereon and a connecting lug projecting forwardly from said rounded forward end.

8. A machine as recited in claim 7 wherein said elongated coupling means comprises an elongated flexible cable having a loop at each end thereof, one of said loops being coupled to said blade near the free lower end thereof and the other of said loops being coupled to said connecting lug.

9. A machine as recited in claim 8 wherein said blade is flat and is provided with a sharpened forward edge and having an aperture near the free end thereof through which the forward loop on said flexible cable passes.

10. A machine as recited in claim 7 wherein said tunnel-forming member has a coaxial bore opening through the rear end thereof, said means for attaching a conduit to said tunnel-forming member comprising a cable fixedly attached to said conduit and extending slidably into said coaxial bore and spring means for resiliently resisting withdrawal of said cable from said bore.

11. A conduit-burying machine as recited in claim 10, whereby said attaching means further comprises a plug fixedly secured in the rear end of said bore, said plug having a coaxial aperture for slidably accommodating said cable, said cable having an annular element on the free end thereof inside said bore and said spring means comprises a compression spring acting between said plug and said element.

References Cited
UNITED STATES PATENTS

| | | | |
|---|---|---|---|
| 996,866 | 4/1911 | Lilly | 61—72.7 |
| 2,702,502 | 2/1955 | Rogneby. | |
| 2,905,253 | 9/1959 | Ditter. | |
| 2,949,871 | 8/1960 | Finn. | |
| 3,201,944 | 8/1965 | Christensen | 61—72.7 X |
| 3,295,333 | 1/1967 | Killoren | 61—72.6 |

EARL J. WITMER, *Primary Examiner.*